US012738068B1

(12) United States Patent
Chong et al.

(10) Patent No.: US 12,738,068 B1
(45) Date of Patent: Sep. 15, 2026

(54) SYSTEM AND METHOD FOR VISIBLY DEFINING A DYNAMICALLY-SIZED EXIT CLEARANCE AREA

(71) Applicant: MOTOROLA SOLUTIONS, INC., Chicago, IL (US)

(72) Inventors: Chung Yong Chong, Simpang Ampat (MY); Vivian Wei Wern Ng, Bayan Lepas (MY); Tze Voon Tan, Bukit Mertajam (MY); Chun Meng Tan, Bayan Lepas (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 19/273,761

(22) Filed: Jul. 18, 2025

(51) Int. Cl.

| | |
|---|---|
| ***G06V 20/52*** | (2022.01) |
| ***G06F 3/16*** | (2006.01) |
| ***G06V 10/764*** | (2022.01) |
| ***G06V 20/59*** | (2022.01) |

(52) U.S. Cl.
CPC ................ *G06V 20/52* (2022.01); *G06F 3/16* (2013.01); *G06V 10/764* (2022.01); *G06V 20/593* (2022.01)

(58) Field of Classification Search
None
See application file for complete search history.

(56) References Cited

U.S. PATENT DOCUMENTS

| | | | |
|---|---|---|---|
| 11,234,098 B1 | 1/2022 | Cheah et al. | |
| 2018/0121956 A1 | 5/2018 | Deluca et al. | |
| 2019/0211587 A1* | 7/2019 | Ganeshan | B60J 5/04 |
| 2019/0353782 A1 | 11/2019 | Spardel | |
| 2020/0394902 A1 | 12/2020 | Elliott et al. | |

FOREIGN PATENT DOCUMENTS

| | | |
|---|---|---|
| EP | 4446952 A1 | 10/2024 |
| KR | 10227858 B1 | 11/1999 |
| KR | 102278581 B1 | 7/2021 |
| WO | 2014047078 A1 | 3/2014 |

* cited by examiner

*Primary Examiner* — Nam D Pham
(74) *Attorney, Agent, or Firm* — Daniel R Bestor

(57) ABSTRACT

A system and method for visibly defining a dynamically-sized exit clearance area is disclosed. The method includes carrying out analytics on a plurality of images, of a first occupancy area, over a first time period, and prior to exit of at least one object from the first occupancy area via a portal, to automatically classify the at least one object as either one or more standard objects, or one or more non-standard objects. The method also includes determining size information: that defines size properties of variably-sized, visible lines indicia, and that is based on a classification corresponding to the automatic classifying of the at least one object. The method also includes generating, during a second time period after the first time period, the visible lines indicia on a traversable surface within a second occupancy area to visibly define an exit clearance area sized in accordance with the size information.

20 Claims, 4 Drawing Sheets

SYSTEM AND METHOD FOR VISIBLY DEFINING A DYNAMICALLY-SIZED EXIT CLEARANCE AREA

BACKGROUND

Physical boundary control refers to establishing and maintaining clear limits related to, for example, personal space, physical touch, and privacy. In some examples, physical boundary control may facilitate comfort and well-being in interactions. An example of a physical boundary control is the yellow line in subway/train stations. This yellow line may be found at the edge of a subway/train platform, indicating where passengers should stand while waiting for the subway/train car. The yellow line may be a part of safety regulations, by helping to ensure that people will stand an adequate distance from the tracks and the arriving transit cars.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
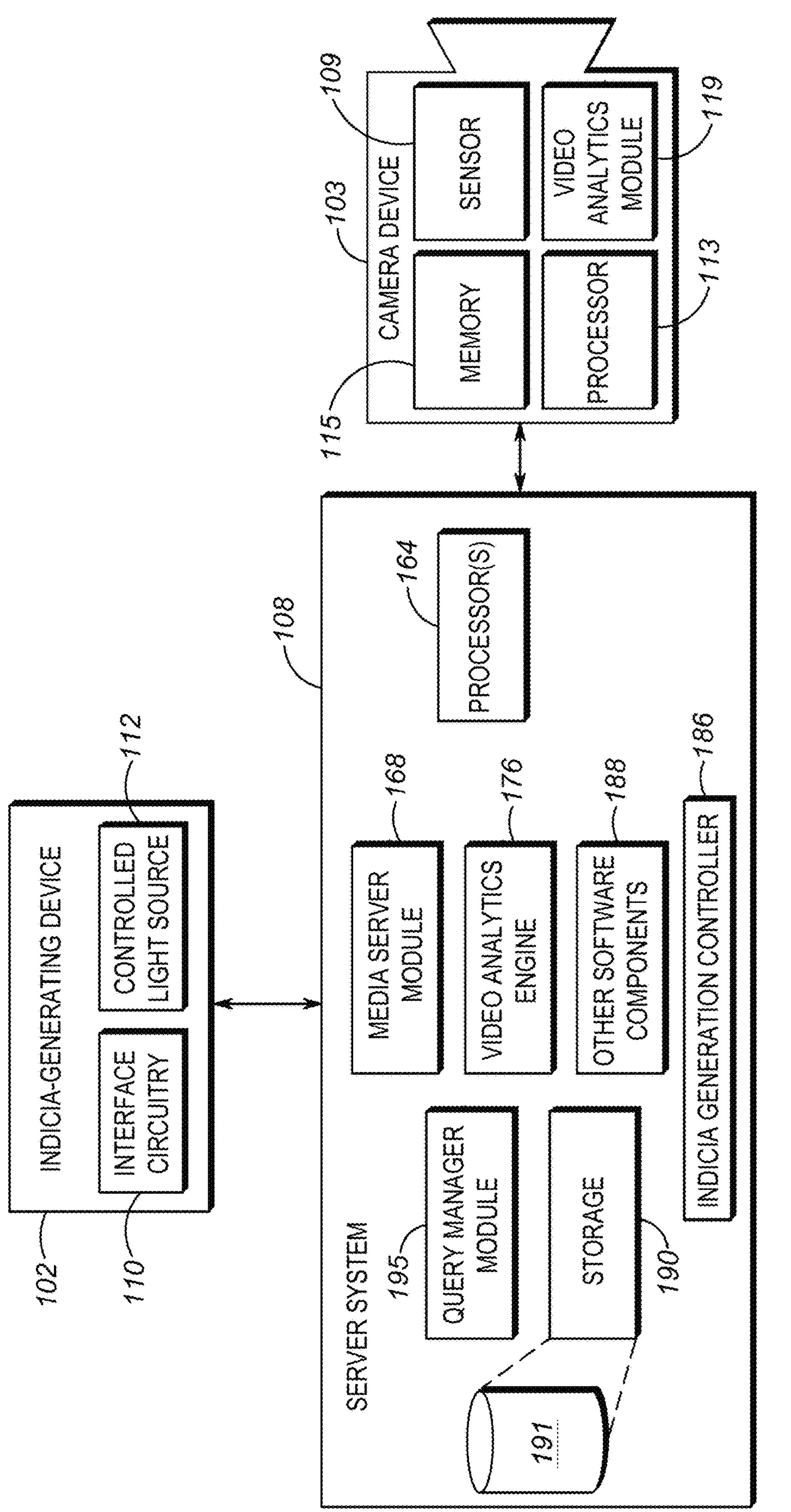
FIG. 1 is a block diagram of a system in accordance with example embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

In accordance with one example embodiment, there is provided a system that includes at least one processor and a surveillance camera configured to capture images of a first occupancy area. Entry into and exit from the first occupancy area is possible via a portal defined between the first occupancy area and a second occupancy area. The system also includes a device configured to generate visible lines indicia on a traversable surface within the second occupancy area. The visible lines indicia is variably sized based on size information in a command communicated to the device. The system also includes at least one electronic storage medium in communication with the at least one processor. The at least one electronic storage medium stores program instructions that when executed by the at least one processor cause the at least one processor to perform carrying out analytics on the images over a first time period, and prior to exit of at least one object from the first occupancy area via the portal, to automatically classify the at least one object as either one or more standard objects, or one or more non-standard objects. Execution of the program instructions further causes the at least one processor to perform determining the size information based on a classification corresponding to the automatic classifying of the at least one object, and causing the command to be transmitted to the device. The device generates, in response to the command, the visible lines indicia during a second time period after the first time period to visibly define an exit clearance area sized in accordance with the size information.

In accordance with another example embodiment, there is provided a method that includes operating a surveillance camera to capture a plurality of images of a first occupancy area. Entry into and exit from the first occupancy area is possible via a portal defined between the first occupancy area and a second occupancy area. The method also includes carrying out, using at least one processor, analytics on the images over a first time period, and prior to exit of at least one object from the first occupancy area via the portal, to automatically classify the at least one object as either one or more standard objects, or one or more non-standard objects. The method also includes determining, using the at least one processor, size information: that defines size properties of variably-sized, visible lines indicia; and that is based on a classification corresponding to the automatic classifying of the at least one object. The method also includes generating, during a second time period after the first time period, the visible lines indicia on a traversable surface within the second occupancy area to visibly define an exit clearance area sized in accordance with the size information.

Example embodiments are herein described with reference to flowchart illustrations and/or block diagrams of methods, apparatus (systems) and computer program products according to example embodiments. It will be understood that at least some of the blocks of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block(s).

The computer program instructions may also be loaded onto a computer or other programmable data processing apparatus that may be on or off-premises, or may be accessed via the cloud in any of a Software as a Service (SaaS), Platform as a Service (PaaS), or Infrastructure as a Service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

The term "object" as used herein is understood to have the same meaning as would normally be given by one skilled in the art of video analytics, and examples of objects may include, for instance, humans, vehicles, animals, portable objects like moving boxes or furniture, etcetera.

Further advantages and features consistent with this disclosure will be set forth in the following detailed description, with reference to the figures.

Referring now to the drawings, and in particular FIG. 1 which is a block diagram of an example system 100 within which methods in accordance with example embodiments can be carried out. Included within the illustrated system 100 is an indicia-generating device 102, at least one camera device 103 (camera 103), and a server system 108. With respect to the indicia-generating device 102, this includes interface circuitry 110 and controlled light source 112. Regarding the interface circuitry 110, this facilitates signal communications between the server system 108 and the indicia-generating device 102. Regarding the controlled light source 112, examples include light emitting diodes, lamp bulbs and other light sources that one skilled in the art would understand to be suitable for the intended purpose.

With respect to the server system 108, this could comprise a single physical machine or multiple physical machines. Additionally, it will be understood that the server system 108 need not be contained within a single chassis, nor necessarily will there be a single location for the server system 108. As will be appreciated by those skilled in the art, at least some of the functionality of the server system 108 can be implemented within the camera 103 rather than within the server system 108.

Still with reference to FIG. 1, the camera 103 is coupled to the server system 108. In some examples, the camera 103 is coupled to the server system 108 via one or more suitable networks. These networks can include the Internet, or one or more other public/private networks coupled together by network switches or other communication elements. The network(s) could be of the form of, for example, client-server networks, peer-to-peer networks, etc. Data connections between the camera 103 and the server system 108 can be any number of known arrangements. In at least one example embodiment, the camera 103 and the server system 108 are within the same Local Area Network (LAN). In some examples, the camera 103 may be coupled to the server system 108 in a more direct manner than as described above.

Although the system 100 illustrated in FIG. 1 only explicitly shows a camera device coupled to the server system 108, it will be understood that the system 100 is not limited in contemplated compositions to just camera device(s). For instance, the system 100 might include, in one example, a heterogeneous mixture of both image sensor device(s) and non-image sensor device(s) coupled to the server system 108.

Still with reference to FIG. 1, the server system 108 includes one or more processors 164. The server system 108 also includes several software components for carrying out other functions of the server system 108. For example, the server system 108 includes a media server module 168. The media server module 168 handles requests related to storage, retrieval and formatting of security video and security images captured by the at least one camera device 103 (camera 103) in the system 100. The server system 108 also includes a video analytics engine 176. The video analytics engine 176 can, in some examples, be any suitable software that carries out computer vision related functions in a manner understood by those skilled in the art (these video analytics functions may be complementary to any video analytics performed within the housing of the security camera itself, which is sometimes referred to as analytics at the edge). Also, those skilled in the art will appreciate that, in some instances, the video analytics engine 176 may be programmed with a detection classifier that evaluates a received video stream (for example, an image or part of an image of the video stream captured by the camera device 103) to determine if an instance of an object of interest that is defined in the detection classifier is detected or not from the evaluated video stream. Moreover, and as those skilled in the art will appreciate, in the case where machine learning (such as for example, neural network technology) is employed in detection and classification, percentage confidences can be generated in relation to likelihoods of detections and classifications.

Continuing on, the illustrated server system 108 also includes an indicia generation controller 186. The indicia generation controller 186 packetizes size information and control information needed for operation of the indicia-generation device 102 (it will be understood that assembled packets are communicated from the server system 108 to the indicia-generation device 102).

The server system 108 also includes a number of other software components 188. These other software components will vary depending on the requirements of the server system 108 within the overall system. As one example, the other software components 188 might include special test and debugging software, or software to facilitate version updating of modules within the server system 108.

Regarding the data store 190, this comprises, for example, one or more databases 191 which may facilitate the organized storing of any one or more of recorded security video, non-video sensor data, physical access control data, etcetera in accordance with example embodiments. The one or more databases 191 may also contain metadata related to, for example, the recorded security video that is storable within the one or more data stores 190. Examples of metadata that may be expected to be derived directly or indirectly from video data include location in field of view, object ID, bounding box-related data, tracking position relative to field of view, etc. Management of data within the one or more databases 191 may be facilitated by a query manager module 195. In some examples, the query manager module 195 can be employed to enable a user to search and retrieve video of events of interest such as, for example, video clips evidencing non-compliance of standing behind the visible lines indicia, video clips where visible lines indicia may have not been correctly generated, etcetera. Delivery of retrieved video to, for example, a client computing device forming a part of the system 100, may be facilitated by the media server module 168.

Optionally, the system 100 may include connections to one or more cloud services. For example, the server system 108 may be connected to the cloud service(s) by the Internet and/or one or more wireless and/or wired wide area networks. It will be understood that some example embodiments may include the cloud service(s) which may include storage and/or run software modules complementary to (or in addition) to those provided by the server system 108 within the system 100.

Still with reference to FIG. 1, the camera device 103 is operable to capture a plurality of images and produce image data representing the plurality of captured images. The illustrated camera 103 is an image capturing device. Furthermore, although only one camera device is shown in FIG. 1, it will be understood that the system 100 may include any suitable number of cameras.

The camera 103 includes an image sensor 109 for capturing a plurality of images. The camera 103 may be a digital video camera and the image sensor 109 may output captured light as a digital data. For example, the image sensor 109 may be a CMOS, NMOS, or CCD. In some embodiments, the camera 103 may be an analog camera connected to an encoder. The illustrated camera 103 may be a 2D camera; however use of a 3D camera, a stereo camera, or any other suitable type of camera within the system 100 is contemplated.

The image sensor 109 may be operable to capture light in one or more frequency ranges. For example, the image sensor 109 may be operable to capture light in a range that substantially corresponds to the visible light frequency range. In other examples, the image sensor 109 may be operable to capture light outside the visible light range, such as in the infrared (IR) and/or ultraviolet range. In other examples, the camera 103 may be a "multi-sensor" type of camera, such that the camera 103 includes at least one set of two or more sensors that are operable to capture light in different and/or same frequency ranges.

The camera 103 may be a dedicated camera. It will be understood that a dedicated camera herein refers to a camera whose principal features is to capture images or video. In some example embodiments, the dedicated camera may perform functions associated with the captured images or video, such as but not limited to processing the image data produced by it or by another camera. For example, the dedicated camera may be a fixed-location security camera, such as any one of a Pan-Tilt-Zoom (PTZ) camera, dome camera, in-ceiling camera, box camera, and bullet camera.

The camera 103 includes one or more processors 113, one or more video analytics modules 119, and one or more memory devices 115 coupled to the processors and one or more network interfaces. Regarding the video analytics module 119, this generates metadata outputted to the server system 108. The metadata can include, for example, records which describe various detections of objects such as, for instance, pixel locations for the detected object in respect of a first record and a last record for the camera within which the respective metadata is being generated.

Regarding the memory device 115, this can include a local memory (such as, for example, a RAM and a cache memory) employed during execution of program instructions. Regarding the processor 113, this executes computer program instructions (such as, for example, an operating system and/or software programs), which can be stored in the memory device 115.

In various embodiments the processor 113 may be implemented by any suitable processing circuit having one or more circuit units, including a digital signal processor (DSP), graphics processing unit (GPU) embedded processor, a visual processing unit or a vision processing unit (both referred to herein as "VPU"), etc., and any suitable combination thereof operating independently or in parallel, including possibly operating redundantly. Such processing circuit may be implemented by one or more integrated circuits, including being implemented by a monolithic integrated circuit (MIC), an Application Specific Integrated Circuit (ASIC), a Field Programmable Gate Array (FPGA), etc. or any suitable combination thereof. Additionally or alternatively, such processing circuit may be implemented as a programmable logic controller (PLC), for example. The processor may include circuitry for storing memory, such as digital data, and may comprise the memory circuit or be in wired communication with the memory circuit, for example. A system on a chip (SOC) implementation is also common, where a plurality of the components of the camera 103, including the processor 113, may be combined together on one semiconductor chip. For example, the processor 113, the memory device 115 and the network interface of the camera 103 may be implemented within a SOC. Furthermore, when implemented in this way, a general purpose processor and one or more of a GPU or VPU, and a DSP may be implemented together within the SOC.

In various example embodiments, the memory device 115 coupled to the processor 113 is operable to store data and computer program instructions. The memory device 115 may be implemented as Read-Only Memory (ROM), Programmable Read-Only Memory (PROM), Erasable Programmable Read-Only Memory (EPROM), Electrically Erasable Programmable Read-Only Memory (EEPROM), flash memory, one or more flash drives, universal serial bus (USB) connected memory units, magnetic storage, optical storage, magneto-optical storage, etc. or any combination thereof, for example. The memory device 115 may be operable to store memory as volatile memory, non-volatile memory, dynamic memory, etc. or any combination thereof.

Figure 2:
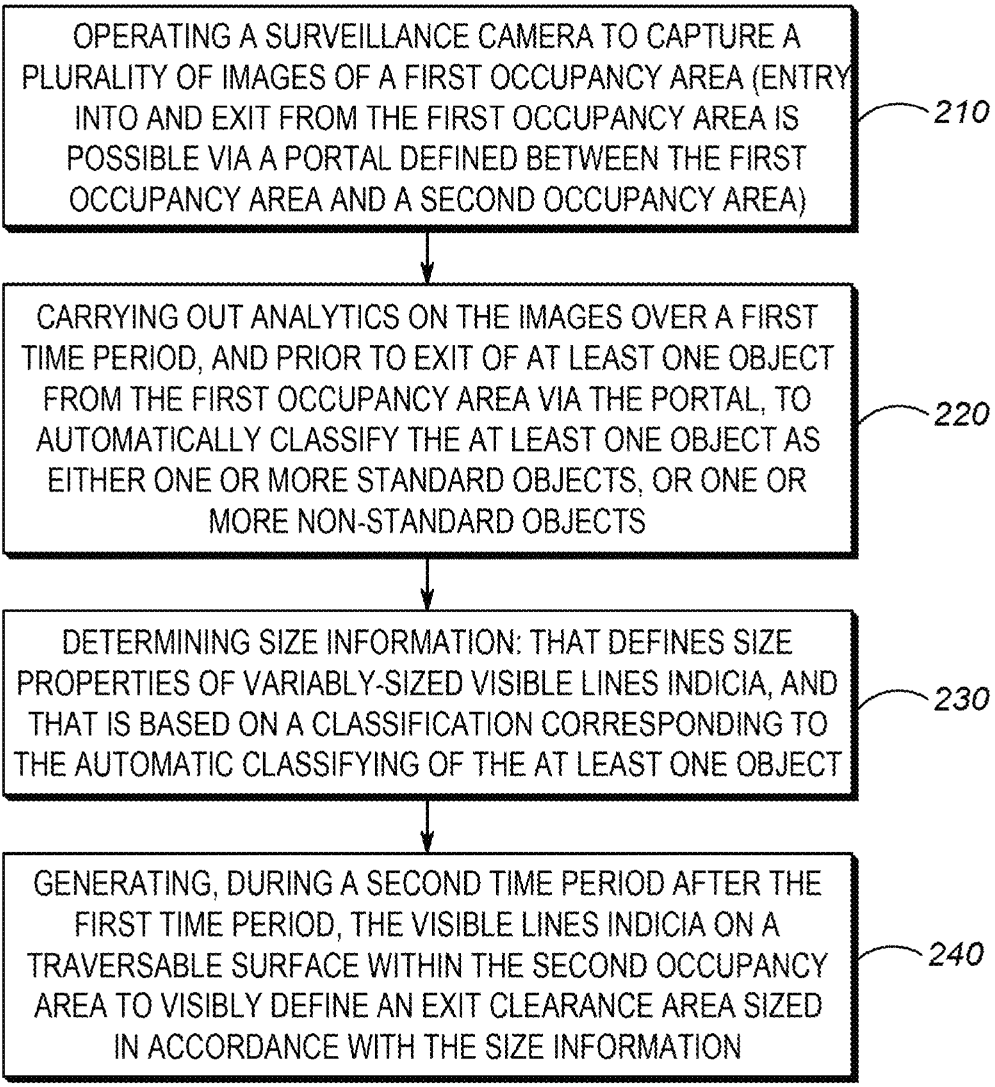
FIG. 2 is a flow chart illustrating a method in accordance with an example embodiment.
Figure 3:
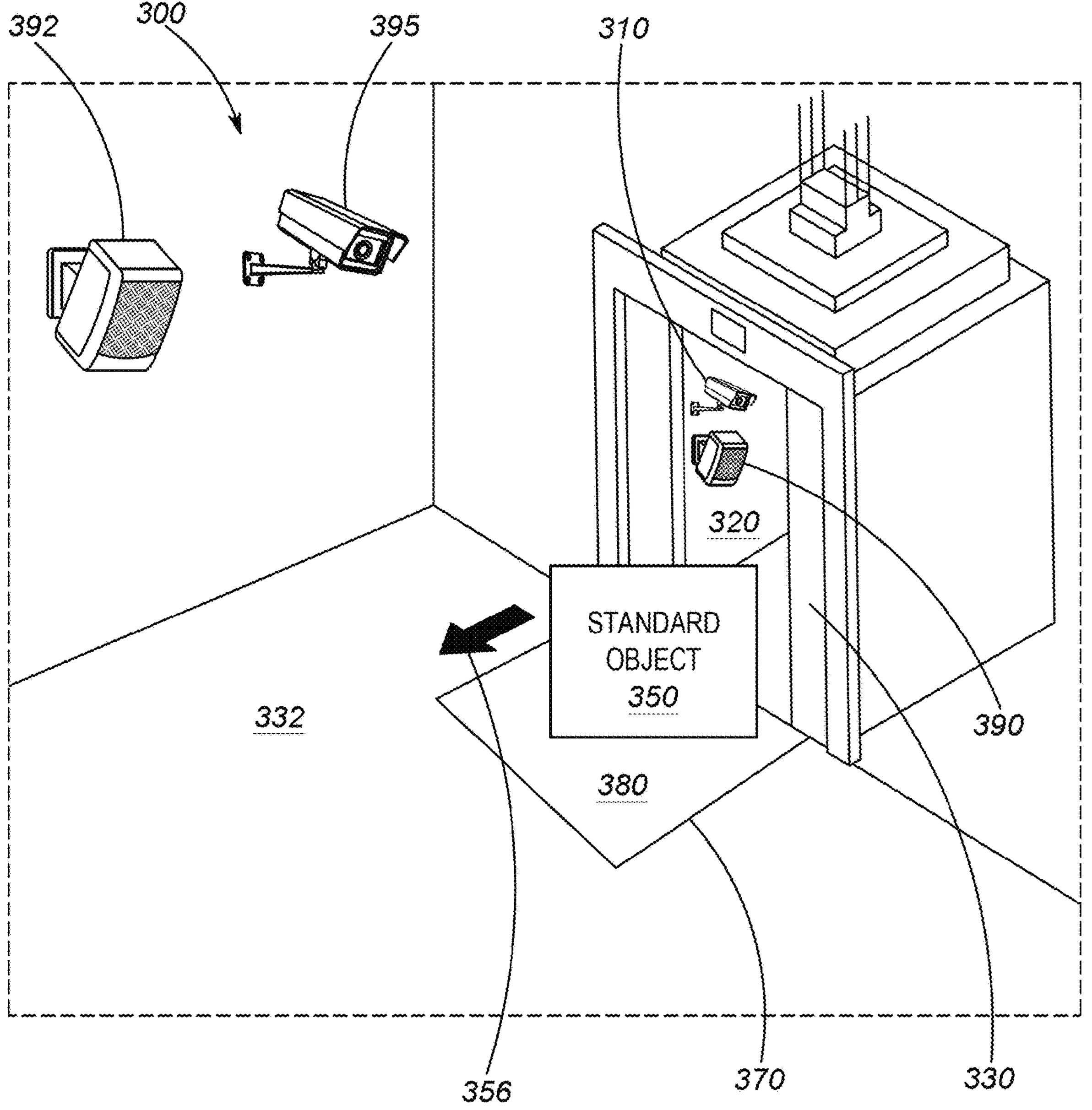
FIG. 3 is a diagram of an example elevator area of a building within which the method of FIG. 2 may be carried out.
Figure 4:
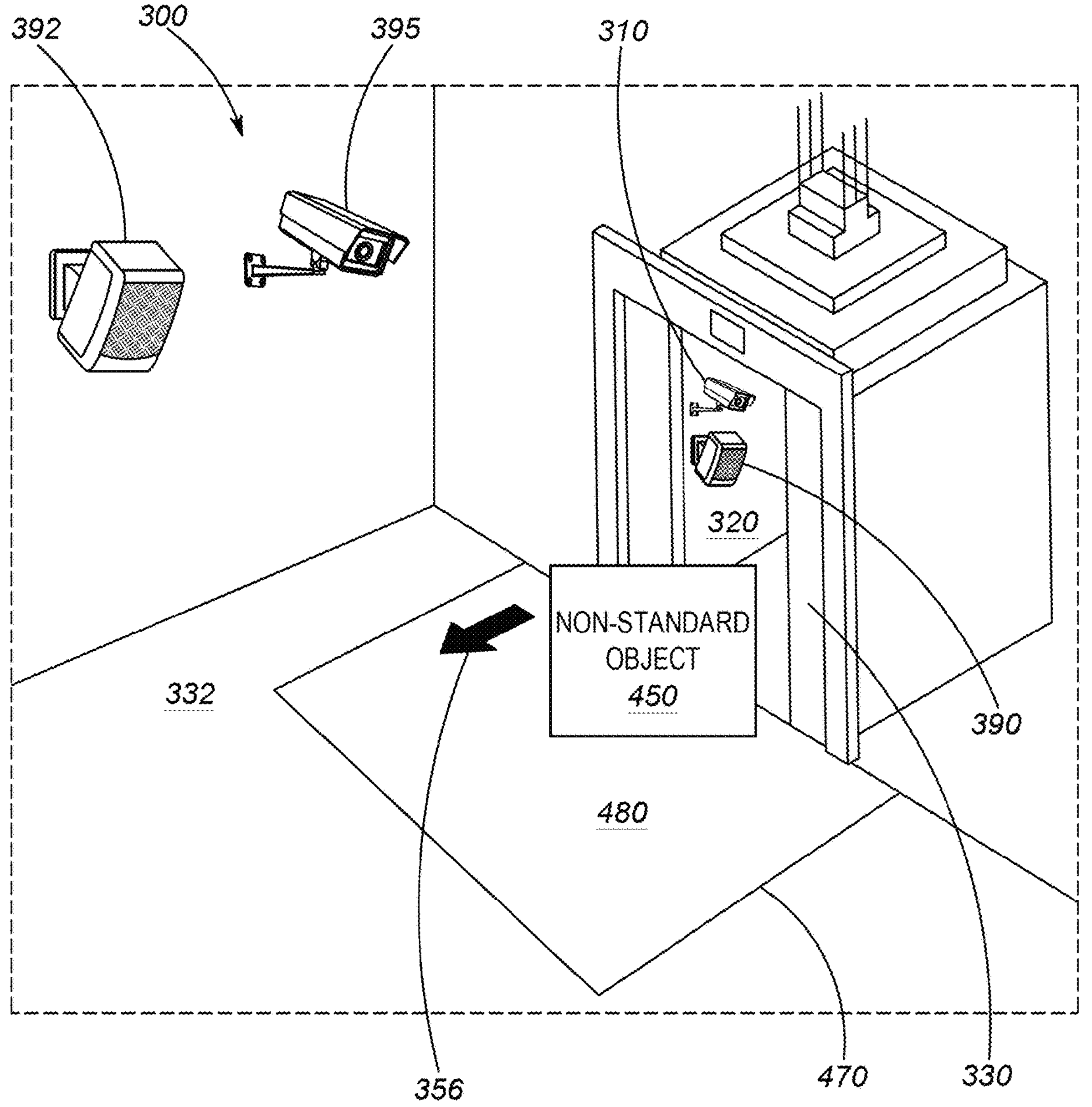
FIG. 4 is another diagram of the example elevator area of FIG. 3, but illustrating a non-standard object exiting an elevator instead of the standard object shown in FIG. 3.

Reference is now made to FIGS. 2-4. FIG. 2 is a flow chart illustrating a method 200 in accordance with an example embodiment. FIGS. 3 and 4 are diagrams of an example elevator area 300 of a building within which the method 200 may be carried out.

Firstly, in respect of the method 200 of FIG. 2, a surveillance camera is operated (210) to capture a plurality of images of a first occupancy area. For example, surveillance camera 310 in FIGS. 3 and 4 captures video of entry into and exit from first occupancy area 320 (the surveillance camera 310 corresponds to the camera 103 of FIG. 1, and the details previously described in respect of that camera may be considered to apply to the surveillance camera 310 as well). Entry and exit from the first occupancy area 320 is possible via a portal (which is an elevator door 330 in the FIGS. 3 and 4 example) defined between the first occupancy area 320 and a second occupancy area 332.

Next in the method 200, analytics on the images is carried out (220) over a first time period, and prior to exit of at least one object from the first occupancy area 320 via the portal 330, to automatically classify the at least one object as either one or more standard objects (for example, standard object 350 in FIG. 3), or one or more non-standard objects (for example, non-standard object 450 in FIG. 4). (Note that arrow 356 indicates object movement direction, i.e. the object is moving from the first occupancy area 320 to the second occupancy area 332.) In some examples, the above-described classification analytics is carried out by the video analytics module 119 in the camera 103, the video analytics engine 176 in the server system 108, or some combination of both.

Non-standard objects are objects that may be expected to correspond to larger-sized exit clearance areas, and examples of these include the following: a plurality of dangerously stacked or dangerously positioned objects (for instance, moving boxes, furniture, etcetera) in the first occupancy area; a plurality of people numbering above some threshold number; at least one elderly person; at least one child; at least one physically disabled person; at least one expectant mother; and a patient on a gurney. In some examples, the analytics carried out on images of the first occupancy area 320 may determine approximate object volume and/or size dimension(s), and the object(s) may be categorized as non-standard when a volume and/or size dimension threshold is exceeded.

Next in the method 200, size information is determined (230). Importantly, "size" in this context has a different meaning than "size" in the object size context. The size information here at the action 230 is defining size properties of variably-sized, visible lines indicia. Also, this size information may be based at least in part on a classification corresponding to the automatic classifying of the at least one object.

Finally in the method 200, and during a second time period after the first time period, the visible lines indicia is generated (240) on a traversable surface within the second occupancy area 332 to visibly define an exit clearance area sized in accordance with the size information. For example, in FIG. 3 visible lines indicia 370 defines an exit clearance area 380 corresponding to first size information, and in FIG. 4 visible lines indicia 470 defines a larger exit clearance area 480 (i.e. larger relative to the exit clearance area 380) corresponding to second size information. Dimension determination for a given clearance area may take into account any number of suitable factors such as, for example, one or more safety factors, providing some degree of person space, avoiding some degree of physical contact with objects outside of the clearance area, etcetera.

In some examples, the visible line indicia 370 and 470 is generated by the indicia-generating device 102 (FIG. 1). The indicia-generating device 102 may include, for instance, a plurality of Light Emitting Diode (LED) lights within a traversable surface (for example, the floor of the second occupancy area 332). When the indicia-generating device 102 is constructed in such a manner, the generating of the visible lines indicia includes actuation of a select number of the LED lights. Alternatively, the indicia-generating device 102 may include, for instance, at least one light projector configured to generate the visible lines indicia by projecting light onto the above-mentioned traversable surface.

In some examples, a speaker 392 is optionally installed in the second occupancy area 332. (A single speaker is shown for convenience of illustration; however any suitable number of speakers is contemplated.) The speaker 392 is configured to emit an audible warning perceptible within the second occupancy area 332 during at least a portion of the second time period when, for example, the larger exit clearance area 480 applies such that people in the second occupancy area 332 are being warned that more clearance is needed because of the exiting of the non-standard object 450 from the first occupancy area 320. Examples of possible emitted audio include warning noise and spoken words (such as, for instance, words warning of fines or other punishment for not staying outside of the marked clearance area). The emitted audio may occur regardless of whether there is any live detection of a violation of the marked clearance area, or alternatively the emitted audio may be only for when a violation of the marked clearance area is detected from a real time (or near real time) analysis of collected sensor data.

Also shown installed in the first occupancy area 320 is an optional speaker 390. (A single speaker is shown for convenience of illustration; however, any suitable number of speakers is contemplated.) The speaker 390 is configured to emit an audible warning perceptible within the first occupancy area 320 when, for example, the larger exit clearance area 480 applies such that people in the first occupancy area 320 are being warned of, for example, a potential danger due someone or something in the second occupancy area having been detected as having violated boundaries of the larger exit clearance area 480.

Also shown installed in the second occupancy area 332 is an optional surveillance camera 395 configured to capture images of the second occupancy area 332 (the surveillance camera 395 corresponds to an additional camera 103 of FIG. 1, and the details previously described in respect of that camera may be considered to apply to the surveillance camera 395 as well). Analytics may be performed on images captured by the surveillance camera 395 to detect any violations of the exit clearance area during the second time period.

In FIGS. 3 and 4 the first occupancy area 320 is an interior area of an elevator; however in alternative examples the first occupancy area may be something else such as, for instance, an interior area of at least a portion of a passenger vessel (for example, train, subway or metro car), an interior area of at least a portion of a road vehicle, an area of a room or hallway, etcetera. Similarly, while in FIGS. 3 and 4 the second occupancy area 332 is an area in a building, in alternative examples the second occupancy area may be something else such as, for instance, an interior area of at least a portion of a passenger vessel (for example, train, subway or metro car), an interior area of at least a portion of a road vehicle, an interior area of an elevator, etcetera.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etcetera, and cannot generate visible lines indicia on a traversable surface, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Also, it should be understood that the illustrated components, unless explicitly described to the contrary, may be combined or divided into separate software, firmware, and/or hardware. For example, instead of being located within and performed by a single electronic processor, logic and processing described herein may be distributed among multiple electronic processors. Similarly, one or more memory modules and communication channels or networks may be used even if embodiments described or illustrated herein have a single such device or element. Also, regardless of how they are combined or divided, hardware and software components may be located on the same computing device or may be distributed among multiple different devices. Accordingly, in this description and in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system comprising:

at least one processor;

a surveillance camera configured to capture images of a first occupancy area, wherein entry into and exit from the first occupancy area is possible via a portal defined between the first occupancy area and a second occupancy area;

a device configured to generate visible lines indicia on a traversable surface within the second occupancy area, wherein the visible lines indicia is variably sized based on size information in a command communicated to the device; and at least one electronic storage medium in communication with the at least one processor, the at least one electronic storage medium storing program instructions that when executed by the at least one processor cause the at least one processor to perform:

carrying out analytics on the images over a first time period, and prior to exit of at least one object from the first occupancy area via the portal, to automatically classify the at least one object as either one or more standard objects, or one or more non-standard objects, determining the size information based on a classification corresponding to the automatic classifying of the at least one object, and causing the command to be transmitted to the device, wherein the device generates, in response to the command, the visible lines indicia during a second time period after the first time period to visibly define an exit clearance area sized in accordance with the size information.

2. The system as claimed in claim 1 wherein the portal is a door or a gate with electronically controlled opening and closing.

3. The system as claimed in claim 1 wherein:

the surveillance camera is a fixed-location camera, and the at least one processor is housed within the fixed-location camera.

4. The system as claimed in claim 1 wherein the one or more standard objects is at least one person, at least one vehicle, or at least one portable object.

5. The system as claimed in claim 1 wherein the one or more non-standard objects is at least one of: a plurality of objects dangerously positioned or stacked in the first occupancy area; a plurality of people numbering above a threshold number; at least one elderly person; at least one child; at least one physically disabled person; at least one expectant mother; and a patient on a gurney.

6. The system as claimed in claim 1 wherein the device includes a plurality of Light Emitting Diode (LED) lights within the traversable surface, and generating the visible lines indicia includes actuation of a select number of the LED lights.

7. The system as claimed in claim 1 wherein the device includes at least one light projector configured to generate the visible lines indicia by projecting light onto the traversable surface.

8. The system as claimed in claim 1 further comprising at least two speakers configured to operate in concert to emit at least one audible warning perceptible within the first and second occupancy areas.

9. The system as claimed in claim 1 further comprising another surveillance camera configured to capture images of the second occupancy area, wherein the at least one processor is further caused to perform analytics on the second occupancy area images to detect any violations of the exit clearance area during the second time period.

10. The system as claimed in claim 1 wherein the first occupancy area is an interior area of an elevator or an interior area of at least a portion of a passenger vessel.

11. A method comprising:

operating a surveillance camera to capture a plurality of images of a first occupancy area, wherein entry into and exit from the first occupancy area is possible via a portal defined between the first occupancy area and a second occupancy area;

carrying out, using at least one processor, analytics on the images over a first time period, and prior to exit of at least one object from the first occupancy area via the portal, to automatically classify the at least one object as either one or more standard objects, or one or more non-standard objects;

determining, using the at least one processor, size information:

that defines size properties of variably-sized, visible lines indicia, and that is based on a classification corresponding to the automatic classifying of the at least one object; and generating, during a second time period after the first time period, the visible lines indicia on a traversable surface within the second occupancy area to visibly define an exit clearance area sized in accordance with the size information.

12. The method as claimed in claim 11 wherein the portal is a door or a gate with electronically controlled opening and closing.

13. The method as claimed in claim 11 wherein:

the surveillance camera is a fixed-location camera, and the at least one processor is housed within the fixed-location camera.

14. The method as claimed in claim 11 wherein the one or more standard objects is at least one person, at least one vehicle or at least one portable object.

15. The method as claimed in claim 11 wherein the one or more non-standard objects is at least one of: a plurality of objects dangerously positioned or stacked in the first occupancy area; a plurality of people numbering above a threshold number; at least one elderly person; at least one child; at least one physically disabled person; at least one expectant mother; and a patient on a gurney.

16. The method as claimed in claim 11 wherein the generating the visible lines indicia includes actuation of a select number of a plurality of Light Emitting Diode (LED) lights within the traversable surface.

17. The method as claimed in claim 11 wherein the generating the visible lines indicia includes causing at least one light projector to project light onto the traversable surface.

18. The method as claimed in claim 11 further comprising emitting at least one audible warning via at least two speakers operating in concert, wherein the audible warning is perceptible within the first and second occupancy areas.

19. The method as claimed in claim 11 further comprising:

operating another surveillance camera configured to capture a plurality of images of the second occupancy area, performing analytics, using the at least one processor, on the second occupancy area images to detect any violations of the exit clearance area during the second time period.

20. The method as claimed in claim 11 wherein the first occupancy area is an interior area of an elevator or an interior area of at least a portion of a passenger vessel.

* * * * *